United States Patent
Küpfer

[11] Patent Number: 6,118,402
[45] Date of Patent: Sep. 12, 2000

[54] PROCESS FOR SIDE LOBE SUPPRESSION AND AMPLITUDE OR PHASE MONOPULSE RADAR DEVICE

[75] Inventor: Hanspeter Küpfer, Birmensdorf, Switzerland

[73] Assignee: Siemens Schweiz AG, Zurich, Germany

[21] Appl. No.: 09/264,001

[22] Filed: Mar. 8, 1999

[30] Foreign Application Priority Data

Mar. 9, 1998 [CH] Switzerland .................. 0565/98

[51] Int. Cl.⁷ ...................................................... G01S 13/42
[52] U.S. Cl. ........................ 342/149; 342/152; 342/194; 342/140
[58] Field of Search ................. 342/80, 91, 94, 342/115, 135, 140, 141, 149, 152, 159, 162, 194, 195, 203

[56] References Cited

U.S. PATENT DOCUMENTS

| | | | |
|---|---|---|---|
| 3,599,208 | 8/1971 | Nelson | 342/92 |
| 3,772,695 | 11/1973 | Hoffman | 342/77 |
| 3,859,661 | 1/1975 | Ruvin et al. | 342/16 |
| 4,450,448 | 5/1984 | Alanese et al. | 342/372 |
| 4,672,378 | 6/1987 | Drabowitch et al. | 342/17 |
| 4,939,523 | 7/1990 | Jehle et al. | 343/705 |
| 5,017,929 | 5/1991 | Tsuda | 342/427 |
| 5,072,224 | 12/1991 | Verbeke et al. | 342/152 |
| 5,101,209 | 3/1992 | Martin | 342/152 |
| 5,311,192 | 5/1994 | Varga et al. | 342/188 |
| 5,400,035 | 3/1995 | Liu | 342/149 |
| 5,414,428 | 5/1995 | Gallagher et al. | 342/132 |
| 5,450,089 | 9/1995 | Hui et al. | 342/195 |
| 5,576,711 | 11/1996 | Morris et al. | 342/152 |
| 5,784,022 | 7/1998 | Küpfer | 342/80 |
| 5,847,675 | 12/1998 | Poinsard | 342/81 |

FOREIGN PATENT DOCUMENTS

97/22890  6/1997  WIPO .

OTHER PUBLICATIONS

M. Skolnik, *Radar–Handbook*, McGraw Hill, Chapter 21 (1970).
S. Sherman, "Monopause Principles and techniques," *Aspects of Modern Radar*, E. Brookner (ed), Artech House Inc., Chapter 5 (1988).
A. Acker, *How to Speak Radar, Basic Fundamentals and Applications of Radar*, Varian Assoc., pp. 30–31 (1988).
Schenkel, *Crossfeed Monopause—A Specific Method to Eliminate Mistracking Over Sea*, Presented at International Conference "Radar–87", London (Oct. 19–21, 1987).
*Antenna Engineering Handbook, Third Edition*, R. Johnson (ed), McGraw–Hill, Inc., Chapter 33, pp. 33-6—33-8 (1993).

*Primary Examiner*—John B. Sotomayor
*Attorney, Agent, or Firm*—Greenblum & Bernstein, P.L.C.

[57] ABSTRACT

The process is used for suppressing the effect of signals that are received or sent via side lobes of an antenna (PA; HA) of an amplitude or phase monopulse radar device, in which for the purpose of position measurement of a first and, if need be, a second target (T1, T2) detected by the radar beam, three illumination functions Je(Lx), Jk(Lx) and Js(Lx) for the antenna (PA; HA) are provided for each measurement axis, as well as antenna functions Fe(X), Fk(X), and Fs(X) resulting from them. The first, second, and third illumination functions Je(Lx); Jk(Lx), and Js(Lx) are selected in this connection so that a quotient function Qe(X)=Fe(X)/Fs(X) or Qk(X)=Fk(X)/Fs(X), which is linearly or quadratically dependent on the target direction, is produced by normalizing the first and the second antenna functions Fe(X); Fk(X) with the third antenna function Fs(X). The power of this quotient is compared with at least one threshold value $th_e$ or $th_k$ that is selected in accordance with the magnitude of the main antenna lobe, and when the threshold value $th_e$ or $th_k$ is exceeded, the effect of the received signal is suppressed. In a preferred embodiment of the invention, the provision is made that the zero points of the antenna functions Fe(X), Fk(X), and Fs(X) are shifted slightly in relation to one another.

16 Claims, 7 Drawing Sheets

Fig. 2

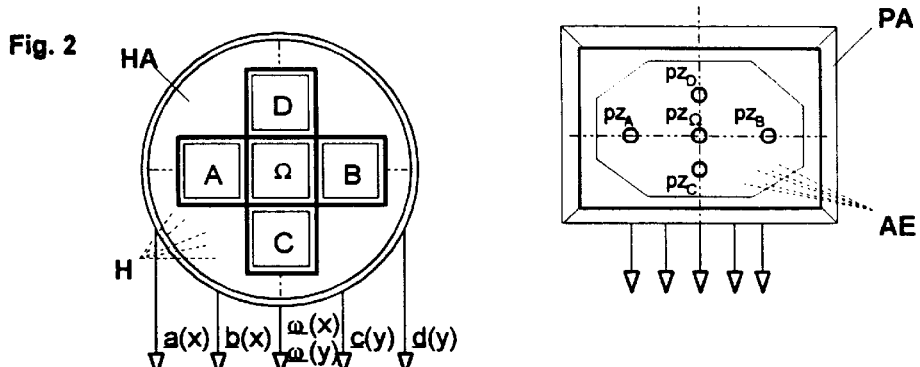

AF

Azimut

$Fs(X) = E \cdot a(X) + H \cdot b(X) + G \cdot \omega(X)$ $Fe(X) = R1 \cdot a(X) + S1 \cdot b(X) + T1 \cdot \omega(X)$ $Fk(X) = R2 \cdot a(X) + S2 \cdot b(X) + T2 \cdot \omega(X)$

Elevation

$Fs(Y) = E \cdot c(Y) + H \cdot d(Y) + G \cdot \omega(Y)$ $Fe(Y) = R3 \cdot c(Y) + S3 \cdot d(Y) + T3 \cdot \omega(Y)$ $Fk(Y) = R4 \cdot c(Y) + S4 \cdot d(Y) + T4 \cdot \omega(Y)$

NM $Qe(X) = Fe(X)/Fs(X)$   $Qk(X) = Fk(X)/Fs(X)$   $Qe(Y)$   $Qk(Y)$

QG

| Qe p(X) | Qk p(X) | Qe p(Y) | Qk p(Y) |
| Qe q(X) | Qk q(X) | Qe q(Y) | Qk q(Y) |

PROC $$\frac{F1(x) - Qe\ p}{Qe\ q} = \frac{F2(x) - Qk\ p}{Qk\ q}$$

$$\frac{F1(y) - Qe\ p}{Qe\ q} = \frac{F2(y) - Qk\ p}{Qk\ q}$$

→ x1
→ x2
→ y1
→ y2

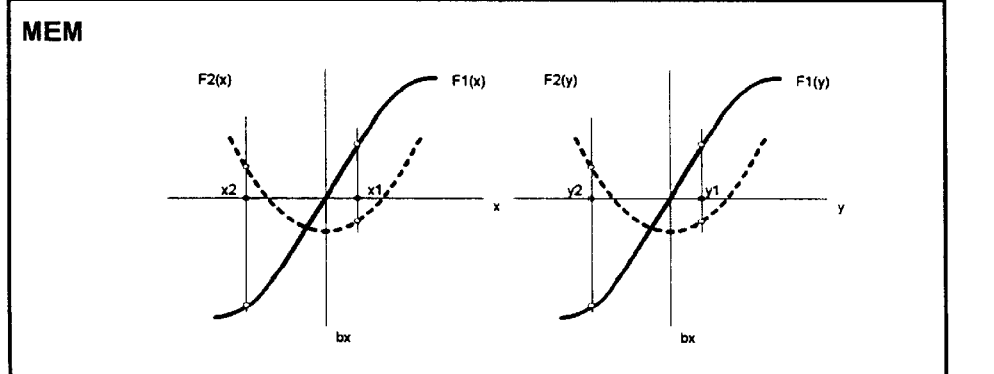

MEM $Pekv(X) = r1 * Pev(X) + r2 * Pkv(X)$

PROCESS FOR SIDE LOBE SUPPRESSION AND AMPLITUDE OR PHASE MONOPULSE RADAR DEVICE

BACKGROUND OF THE INVENTION

1. Field of the Invention

The current invention relates to a method and device for suppressing the effect of signals that are received or sent via side lobes of an antenna of an amplitude or phase monopulse radar device.

2. Discussion of Background Information

In order to locate and if need be, track flying objects, normally monopulse radar devices are used, as have been described, among others, in S. M. Sherman, "Monopulse Princeples and Techniques", Artech House, Norwood 1984. With monopulse radar devices, angular error signals in azimuth and elevation are generated with each received pulse, which become zero when the antenna axis or bore sight axis is aimed precisely at the target. The orientation and if need be tracking of the bore sight axis is executed mechanically in horn antennae. Often in array antennae, the measurement range in elevation is scanned electronically and the measurement range in azimuth is scanned mechanically (see A. E. Acker, "How to Speak Radar", Basic Fundamentals and Applications of Radar, Varian Associates, Palo Alto, 1988, pp. 30 & 31).

Known amplitude or phase monopulse radar devices supply precise angular measurement data with regard to a flying object, provided that in addition to the signals that are received directly from the monitored flying object, no signals from other objects and no singly or multiply reflected signals from the first or the other objects are received.

FIG. 1 shows two flying objects T1 and T2 that have been detected by the main lobe ml of an antenna, of which the first is disposed above the bore sight axis bx and the second is disposed below this axis (see U.S. Pat. No. 4,672,378, FIG. 6). According to S. M. Sherman, chapter 8, pp. 201–210, the spatial position of a flying object can no longer be precisely determined with a conventional monopulse radar device as soon as a second flying object is disposed in the same radar beam. In comparison to the single-target case, the phase of the resulting differential signal changes in relation to the sum signal. In addition, conventional monopulse radar devices supply erroneous angular measurement data as long as the targets cannot be separated distance-wise. A special instance of the two-target case is when the radar echo reflected by a flying object is reflected, for example, on the surface of water. Also depicted is the fact that a third flying object T3 has been detected by a side lobe sl of the antenna, which impairs the measurement of the first two flying objects T1 and T2 or, (in the absence of objects T1, T2) incorrectly indicates a detection of the object T3 in the direction of the main lobe.

Erroneous measurements of objects flying over water are prevented by means of the process known from Dr. A. Schenkel, "Crossfeed Monopulse—a Specific Method to Eliminate Mistracking Over Sea", presented at the International Conference "Radar 87", London, Oct. 19–21, 1987. Although the (crossfeed) process described has brought fundamental improvements over the conventional monopulse process, under certain circumstances, measurement errors must also be reckoned with in this process. The shortcomings of the crossfeed process were eliminated by the curvature process known from WO 97/22890, in which three antenna functions (sum, difference, curvature) are used for each measurement axis.

Neither the classic monopulse process, the crossfeed process, nor the curvature process permit a determination to be made as to whether single targets or double targets have been received from the direction of the main lobe ml or via side lobes sl of the antenna. In addition, interference signals are often received from the side lobe region sl, which impair the processing of the signals of the actual targets. Signals from the side lobe region therefore should preferably be blanked.

So-called SLS and SLC processes are used to suppress signals that are received from the side lobe region. Through the SLS process (side lobe blanking or side lobe suppression), a suitable measurement method is used to determine whether a signal has been received from the side lobe region. Depending on the measurement result, the received signals are either processed further or are completely suppressed. In the latter case, the useful part of the signal is also lost. In contrast, with the SLC process (side lobe cancellation), a corresponding shaping of the antenna beam achieves the fact that the antenna function has a zero point in the angular range in which the interference signal occurs. As a result, the interference signal is suppressed without impairing the useful signal.

With the SLS process, which is described by way of example in M. Skolnik, "Radar Handbook", McGraw Hill, New York 1970, p. 29–18 or R. C. Johnson, "Antenna Engineering Handbook", 3rd edition, McGraw Hill Book Company, New York, 1993, p. 33–6, in addition to the main antenna, an omni-directional auxiliary antenna is used, which has a virtually constant, but low antenna gain over a large angular range and preferably has a minimum in the direction of the bore sight axis of the main antenna. The signals of both antennae are supplied by way of separate reception stages to a comparator, which produces the quotients of the signal power received by the auxiliary antenna and the main antenna. The effect of the received signal, namely its depiction on the screen as a radar echo, is suppressed so long as the quotient exceeds a predetermined threshold value (RSLS process). Through a suitable adjustment of the threshold value, the angular range can be determined within which the signals are associated with the side lobe and are consequently suppressed. In the ISLS process, the effect, namely the transmission of a transponder response, is suppressed when the transponder is queried by way of the side lobe of a base station.

According to R. C. Johnson, auxiliary antennae whose phase centers do not coincide with that of the main antenna are only partially suitable for RSLS and ISLS processes.

In the curvature process known from WO 97/22890, for the additional execution of the SLS process, one of the antenna functions, the curvature function, can be additionally used as an auxiliary function. Due to the requirement for a particular progression of the curvature function, however, limitations arise that counteract an optimization of the curvature process.

In addition to the three antenna functions provided for target measurement (sum, difference, and curvature), curvature monopulse radar devices have up to now required another auxiliary function in order to use the SLS process according to U.S. Pat. No. 4,450,448, which resulted in a higher cost. In U.S. Pat. No. 4,672,378, conventional monopulse radar devices are described, for which an auxiliary function is embodied for the main antenna in order to carry out the beam production in the SLC process. To that end, illumination functions are provided, by means of which the weighting of the elementary signals of an array antenna are determined as a function of the location lx on the array. The transition from the illumination function to the corresponding antenna function is carried out by means of the Fourier transformation. Performing auxiliary functions on the main antenna permits the use of auxiliary antennae to be eliminated. Furthermore, the phase centers of the main and auxiliary functions are disposed close to one another, which produces various advantages described in U.S. Pat. No. 4,672,378. In contrast to the SLS process described, for example, in M. Skolnik or R. C. Johnson, the auxiliary antenna functions do not have an omni-directional characteristic curve, but have a high antenna gain in the incident direction of an interference signal. The received and weighted interference signals of the auxiliary paths are subtracted in an addition stage from the signal of the main path, whereupon the latter is largely freed of interference elements. The SLC process described in U.S. Pat. No. 4,672,378 required a number of antenna functions to suppress interference signals.

SUMMARY OF THE INVENTION

The object of the current invention, therefore, is to improve the SLS process to such an extent that for radar devices that have three antenna functions per measurement axis for target measurement, no additional antenna functions or auxiliary antennae are required in order to recognize signals that have been received via a side lobe. Furthermore, a monopulse radar device should be disclosed which functions in accordance with the process according to the invention.

This object is attained by a method and device for suppressing the effect of signals that are received or sent via side lobes of an antenna of an amplitude or phase monopulse radar device that substantially obviates one or more of the problems arising from the limitations and disadvantages of the related art. Advantageous embodiments of the invention are disclosed in the remaining claims.

In the process according to the invention, which can be used for phase and amplitude monopulse radar devices, a determination can be made with simple steps as to whether a flying object is detected by the main lobe of the radar antenna or by a side lobe. In particular, radar systems that are operated according to the process described in WO 97/22890 are optimally suited for carrying out the steps according to the invention since no additional auxiliary antennae or additional auxiliary functions have to be embodied. Existing antenna functions can be adopted unchanged or, in a preferred embodiment of the invention, can be adopted in a form that has been modified only slightly. In addition, the process avoids the disadvantages that occur in auxiliary antennae with different phase centers (see R. C. Johnson reference).

Accordingly, the present invention is directed to a method for suppressing the effect of signals that are received or sent via side lobes of an antenna of an amplitude or phase monopulse radar device that includes providing three illumination functions for the antenna for each measurement axis. The three illumination functions provide for position measurement of targets. Three antenna functions result from the three illumination functions for the antenna. A quotient is produced between signals or signal powers that are received or sent via the first or the second antenna function of the three illumination functions for the antenna and the signal or its signal power that is received or sent via the third antenna function of the three illumination functions for the antenna. The quotient is compared with a threshold value. It is determined whether the signal and its signal power were received or sent via a side lobe of the antenna.

In another aspect of the present invention, the first and the second antenna functions are normalized with the third antenna function. Quotient functions are produced from the normalizing. Signal powers of the quotient functions are compared individually or if necessary weighted with factors and summed, with at least one threshold value.

In still another aspect of the present invention, the powers of the signals of the first and second antenna functions are normalized, which have if necessary, been weighted with the factors and vectorially added, with the power of the signals of the third antenna finction. A quotient power function is produced from the second normalizing. The values of the quotient power function may be compared with a threshold value. First transmission signals are sent that are transmitted by the first or the second antenna function to a receiving station chronologically separate from second transmission signals that are transmitted by the third antenna function. In the receiving station a quotient is produced from the powers of the first and second transmission signals. The quotient is compared with a threshold value. The effects of the received signals may be suppressed if the threshold value is exceeded.

In a further aspect of the present invention, the illumination functions may be selected such that the zero points of the antenna functions, which result by Fourier transformation from the illumination functions, occur with at least almost the same target direction or not occur with the same target direction In another aspect of the present invention, the first illumination function may be selected as the first differentiation of the third illumination function and the second illumination function may be selected as the second differentiation of the third illumination function, after which, a shifting of the zero points of the first and the second illumination function may be produced by a linear distortion in the abscissa that represents a function argument such that a progression of the first illumination function is expanded in comparison to the first illumination function and a progression of the second illumination function is compressed in comparison to the second illumination function, wherein the zero points of the first and second antenna functions are disposed at least one of lower and higher values than the corresponding zero points of the third antenna function.

In still another aspect of the present invention, the first illumination function may be selected as the first differentiation of the third illumination function and the second illumination function may be selected as the second differentiation of the third illumination function. Then, a shifting of the zero points of the first and the second illumination function may be produced by a linear distortion in the abscissa that represents a function argument such that a progression of the second illumination function is expanded in comparison to the second illumination function and a progression of the first illumination function is compressed in comparison to the first illumination function. The zero points of the first and second antenna functions are disposed at least one of lower and higher values than the corresponding zero points of the third antenna function.

In a further aspect of the present invention, a reciprocal phase shifting of ±90° may be produced before the summation in the receiving instance or before the reciprocal superimposition in the sending instance. The reciprocal phase shifting may be produced between the signals to be added that belong to the first and the second antenna function.

In another aspect of the present invention, the antenna functions being used for target measurement in accordance with the curvature process, the first antenna function being a slope function, the second antenna function being a curvature function, and the third antenna function being a sum function.

In a still another aspect of the present invention, the threshold value may be selected such that the effects of signals that are received from outside the main lobe are suppressed.

In a further aspect of the present invention, the invention is directed to a radar device for an amplitude or phase monopulse, for carrying out the method previously mentioned that includes: an antenna where three illumination functions and antenna functions result from the three illumination functions may be provided for each measurement axis of the antenna; a division stage where the signals or signal powers that are received or sent via the first or the second antenna function may be compared in the division stage with the signals or signal powers that are received or sent via the third antenna function; and a comparator where the signal emitted by the division stage may be supplied directly to the comparator via a quadrature stage, a weighting stage, and an addition stage. The comparator compares the supplied signal with a threshold value. The comparator sends a signal based on the comparing. The effect of signals that are received or sent via side lobes may be suppressed when the threshold value is exceeded.

In another aspect of the present invention, the signals of the first or the second antenna function may be divisible by the signals of the third antenna function in a division stage. The resulting quotients each may be supplied via a quadrature stage to a comparator in which they are compared with the threshold values.

In still another aspect of the present invention, the signals of at least one of the first and the second antenna function may be divisible by the signals of the third antenna function in a division stage. The resulting quotients each may be supplied via a quadrature stage and a weighting stage to an addition stage. The addition stage may be connected to a comparator in which the supplied signals are compared with the threshold value.

In a further aspect of the present invention, the signals of the first and the second antenna function each may be summed via a weighting stage and an addition stage and may be supplied to a first quadrature stage. The signals of the third antenna function may be supplied to a second quadrature stage. The output signals of the first quadrature stage may be divisible in a division stage by the output signals of the second quadrature stage. The resulting quotient may be compared with the threshold value in the comparator.

In another aspect of the present invention, the invention is directed to a radar system that has an amplitude or phase monopulse radar device that includes a sending stage where the sending stage may be a part of the amplitude or phase monopulse radar device. The sending stage may be used for time-lagged emission of first and second transmission signals to the antenna. A receiving station where the second transmission signals may be transmittable to the receiving station by the first or the second antenna function. The first signals may be transmittable to the receiving station by the third antenna function. A quotient may be produced in the receiving station if need be after being temporarily stored in a memory module. The quotient may be produced in a division stage from the powers of the first and second transmission signals. The quotient may be compared with the threshold value in the comparator.

In still another aspect of the present invention, the illumination functions may be selected such that the zero points of the antenna functions that result by Fourier transformation from the illumination functions occur with at least the same target direction, In a further aspect of the present invention, the illumination functions may be selected such that the zero points of the antenna functions that result by Fourier transformation from the illumination functions not occurring with the same target direction.

BRIEF DESCRIPTION OF THE DRAWINGS

The invention will be explained in more detail below by way of example in conjunction with drawings.

FIG. 2 shows a monopulse radar device suitable for measuring two targets, in which three antenna functions are used for each measurement axis.

DETAILED DESCRIPTION OF THE PRESENT INVENTION

Figure 1:
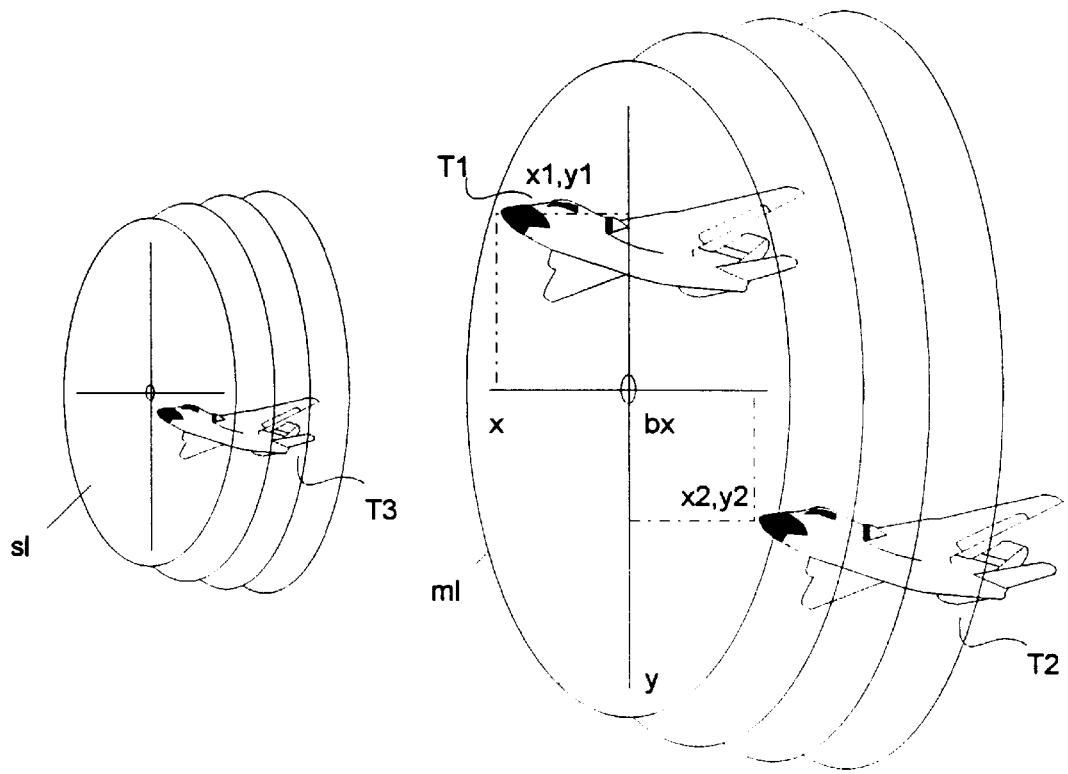
FIG. 1 shows flying objects detected by the main lobe and a side lobe of an antenna.
Figure 3:
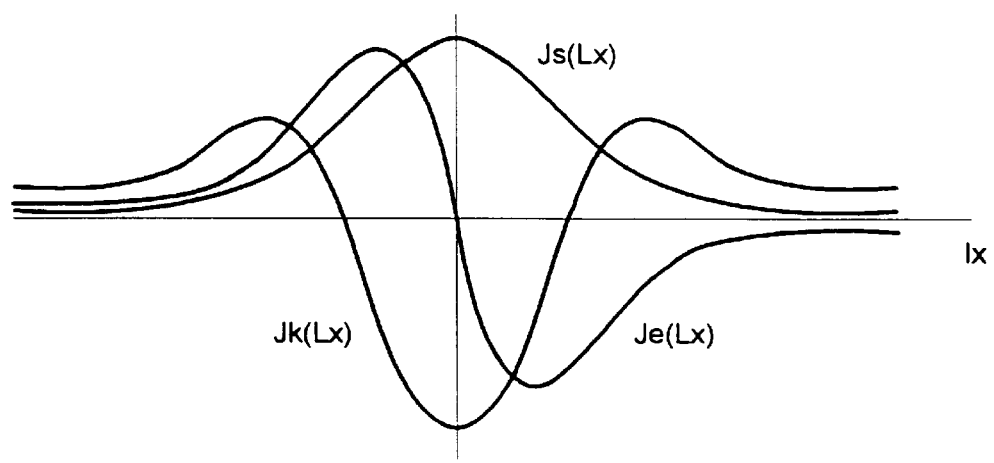
FIG. 3 shows three illumination functions Je(Lx), Jk(Lx), and Js(Lx)

FIG. 2 shows the block circuit diagram of a radar system described in WO 97/22890 in which for each measurement axis, three antenna functions, namely a slope function Fe(X), a curvature function Fk(X), and a sum function Fs(X), are provided for the target measurement (X is the target offset angle). The above-mentioned antenna functions Fe(X), Fk(X), and Fs(X) are produced in a known manner by Fourier transformation of the associated illumination functions Je(Lx), Jk(Lx), and Js(Lx) that are depicted in FIG. 3. The functions Fe(X) and Je(Lx), Fk(X) and Jk(Lx), as well as Fs(X) and Js(Lx) are Fourier transformation pairs. Lx is the normalized position on the aperture of the antenna:

$Lx=2\pi*lx/\lambda$. The normalization of the actual position $lx$ on the aperture of the antenna takes place by the wavelength $\lambda$ of the radar signals.

In the process according to the invention, the two functions $Fe(X)$ with regard to $Fs(X)$ and $Fk(X)$ with regard to $Fs(X)$ are now selected so that they constitute a so-called differentiated pair as long as there is no distortion. This is then the case if the associated illumination functions $$Je(Lx) = const. * \frac{d\,Js(Lx)}{d\,Lx}$$

and $$Jk(Lx) = const. * \frac{d\,2Js(Lx)}{d\,Lx^2}$$

are produced by single or double differentiation of the sum illumination function $Js(Lx)$.

A known property of Fourier transformation is that the Fourier transformation of the differentiation of a function is $X$ times the Fourier transformation of the undifferentiated function, wherein $X$ is the independent variable, in the current case the target direction. With double differentiated functions, a quadratic dependency on the target direction is produced (see [2], p. 338). In addition, a 90° rotation or a multiplication with the imaginary unit $j$ occurs with each differentiation.

The Fourier transformation of the sum illumination function $Js(Lx)$ as well as its nth differentiations $Je(Lx)$; n=1 and $Jk(Lx)$; n=2 therefore produces antenna functions $Fe(X)$, $Fk(X)$, and $Fs(X)$ that differ from one another by the factor $(j*X)^n$:

$$Qe(X)=Fe(X)/Fs(X)=const.*j*X \quad (n=1)$$

or $$Qk(X)=Fk(X)/Fs(X)=const.*(-X^2) \quad (n=2)$$

The quotient functions $Qe(X)$ or $Qk(X)$ of a differentiated pair are thereby linearly or quadratically dependent on the target direction $X$. In the single target case, therefore, both of the above quotient functions produced from differentiated function pairs permit the target directions $X$ to be determined from the functions themselves:

$$X=FE(X)/(const.*j)$$

or $$X^2=FK(X)/(-const.)$$

Figure 4:
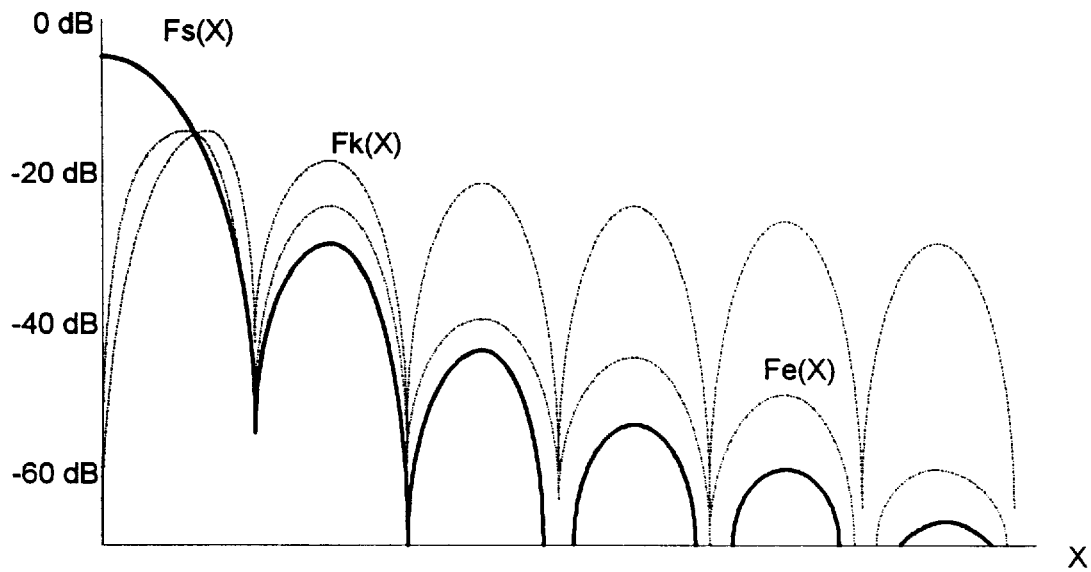
FIG. 4 is a logarithmic depiction of the progression of undistorted antenna functions of a differentiated pair Fe(X), Fk(X), and of Fs(X)

Since the progressions of the functions $Qe(X)$ and $Qk(X)$ also fundamentally apply for large target offset angles $X$ in the region of the side lobes, comparison of the power of $Qe(X)$ or $Qk(X)$ with a suitably selected threshold value can determine whether the target lies inside or outside of the main antenna lobe. However, this is only the case when the zero points, which occur between the side lobes of the antenna diagram and belong to both of the functions $Fe(X)$ and $Fs(X)$ or $Fk(X)$ and $Fs(X)$ that are used for producing the quotient, coincide precisely. If the function pairs have been exactly differentiated mathematically, then this is also the case in actual fact. FIG. 4 shows the ideal progression of the antenna functions $Fs(X)$, $Fk(X)$, and $Fe(X)$ in differentiated pairs whose zero points are congruent.

Figure 5:
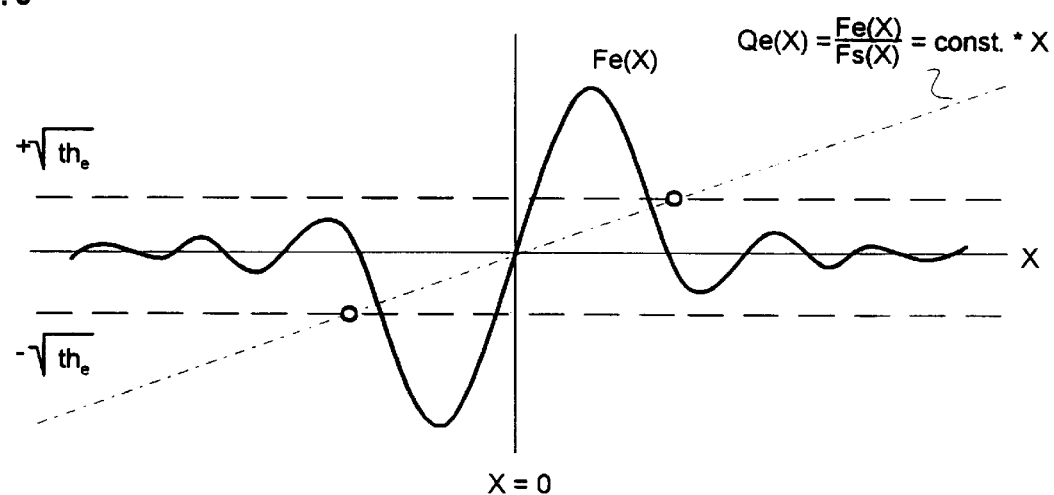
FIG. 5 depicts the progression of the normalized and unnormalized slope function Qe(X)=Fe(X)/Fs(X) or Fe(X)

The quotient function $Qe(X)=Fe(X)/Fs(X)$ produced from the sum function $Fs(X)$ and the slope function $Fe(X)$ has the progression of the dot-and-dash straight line shown in FIG. 5, which passes through zero at the function argument $X=0$, which corresponds to the position of the bore sight axis of the antenna. Straight lines are provided parallel to the abscissa, which correspond to the threshold values $+-\sqrt{th_e}$. The threshold values $th_e$ are determined in such a way that for arguments $X$ that lie outside the angular range of the main lobe of the antenna, the power $Pe(X)$ of the quotient function $Qe(X)$ is comparatively greater than the threshold value $th_e$. A comparator which compares the power $Pe(X)$ of the quotient function $Qe(X)$ to the determined threshold value $th_e$ can therefore easily be used to determine whether signals have been received via the main lobe or via side lobes.

Figure 6:
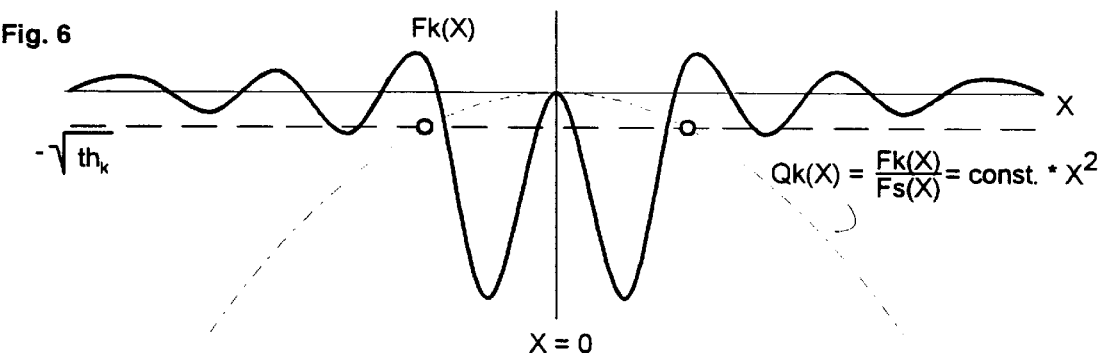
FIG. 6 depicts the progression of a normalized and unnormalized curvature function Qk(X)=Fk(X)/Fs(X) or Fk(X)

The quotient function $Qk(X)=Fk(X)/Fs(X)$ produced from the sum function $Fs(X)$ and the curvature function $Fk(X)$ has the progression of the dot-and-dash parabola shown in FIG. 6, which has a minimum of the negative value at the function argument $X=0$, which corresponds to the position of the bore sight axis of the antenna. A straight line is provided parallel to the abscissa, which corresponds to a threshold value $+\sqrt{th_k}$. The threshold value $th_k$ is determined in such a way that for arguments $X$ that lie outside the angular range of the main lobe of the antenna, the power $Pk(X)$ of the quotient function $Qk(X)$ is comparatively greater than the threshold value $th_k$. A comparator which compares the power $Pk(X)$ of the quotient function $Qk(X)$ to the determined threshold value $th_k$ can therefore easily be used to determine whether signals have been received via the main lobe or via side lobes.

The powers $Pe(X)$, $Pk(X)$ are determined through quadrature of the quotient functions $Qe(X)$ and $Qk(X)$.

Since experience has shown that function progressions normally deviate from the ideal shown in FIG. 4, and their zero points therefore do not usually occur with the same target direction, conclusions based on one of the processes described above would not be sufficiently reliable. The progression of the quotient function $Qe(X)$ only approximately corresponds to a straight line in reality. The progression of the quotient function $Qk(X)$ only approximately corresponds to a parabola in reality. In the zero point region of the functions $Fe(X)$, $Fk(X)$, the quotient functions $Qe(X)$, $Qk(X)$ can thus deviate considerably from the ideal progression or can have no zero points and poles at all.

According to the invention, an improvement of the process is achieved by virtue of the fact that the powers $Pe(X)$, $Pk(X)$ of the quotient functions $Qe(X)$, $Qk(X)$ are weighted with factors $r1$, $r2$, added, and only then compared with a threshold value. The quotient power sum function $Pek(X) = r1 * Pe(X) + r2 * Pk(X)$ that is produced in this manner reliably assures the detection of signals that are received via side lobes even if the slope function $Fe(X)$ or the curvature function $Fk(X)$ has a zero point that is shifted in relation to the relevant zero point of the sum function $Fs(X)$, by which the relevant quotient function $Qe(X)$ or $Qk(X)$ can assume the function value zero even outside the range of the main lobe. As long as the two zero points of the quotient functions $Qe(X)$, $Qk(X)$ do not occur with the same target direction, the assurance remains that the provided threshold value for target directions and arguments $X$ that lie outside the main lobe of the antenna will not be undershot.

Figure 8:
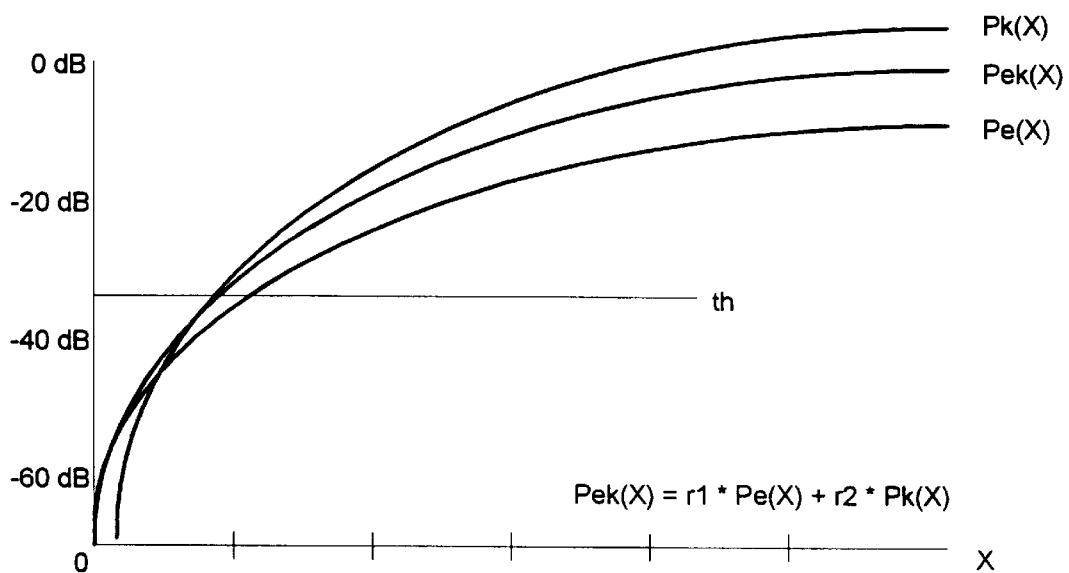
FIG. 8 depicts the signal powers Pe(X), Pk(X) of the quotient functions Qe(X), Qk(X) with undistorted antenna functions Fe(X), Fk(X), and Fs(X) and their weighted sum Pek(X)

FIG. 8 is a logarithmic depiction of the ideal progressions of the quotient power functions $Pe(X)$, $Pk(X)$ and the quotient power sum function $Pek(X)$, which has no zero points. As mentioned above, undesirable zero points of the quotient power sum function $Pek(X)$ can occur if the zero points of the slope function $Fe(X)$ and the curvature function $Fk(X)$ are congruent and deviate from the corresponding zero point of the sum function $Fs(X)$.

Since in many instances, not only a high probability, but a certainty is required that the progression of the quotient sum function Qek(X) does not have any greater deviations or any zero points at all, a shifting of the zero points of the slope function Fe(X) and the curvature function Fk(X) is carried out according to the invention in such a way that the zero points of the slope function Fe(X) and the curvature function Fk(X) no longer occur at exactly the same target angle.

Figure 7:
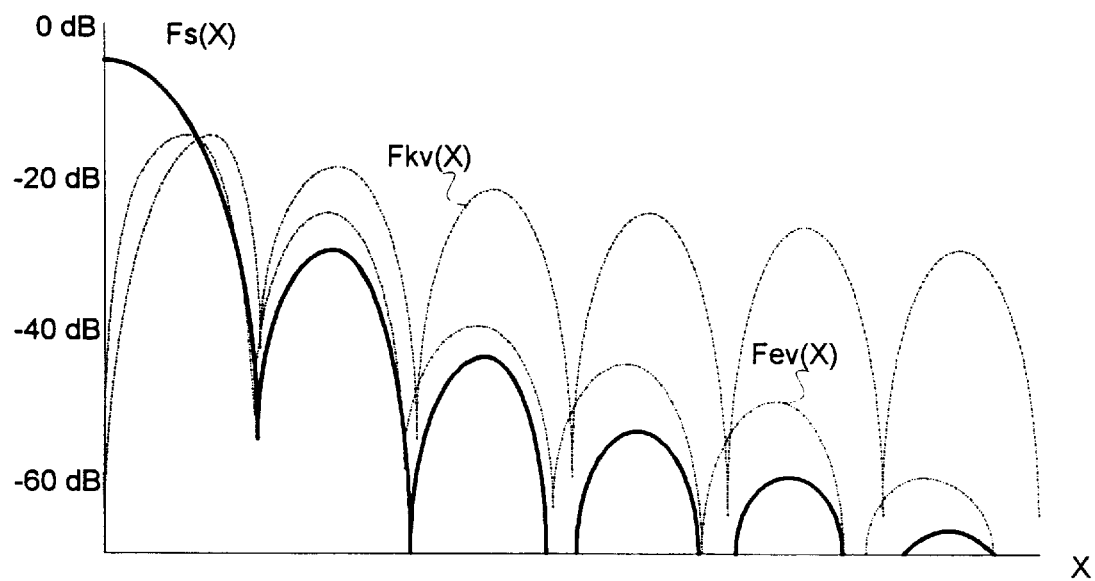
FIG. 7 is a logarithmic depiction of the progression with antenna functions Fev(X), Fkv(X), and Fsv(X) that are distorted linearly in the abscissa (undistorted in FIG. 4)

Preferably, the provision is made that the zero points of the one function Fe(X) or Fk(X) are shifted to lower values and the zero points of the other function Fk(X) or Fe(X) are shifted to higher values of the sum function Fs(X), which for example produces a compressed slope function Fev(X) and an expanded curvature function Fkv(X) (see FIG. 7).

The shifting of the zero points takes place, e.g. in the simplest way, during the calculation of the antenna design by virtue of the fact that a low linear distortion in the abscissa Lx of the differentiated illumination functions Je(Lx) and Jk(Lx) is provided, which produces altered illumination functions Jve(Lx)=Je(Lx(1+ve)) or Jvk(Lx)=Jk(Lx(1−vk)). The shift factors ve and vk, which are normally equal, are selected to be correspondingly small. Therefore, the abscissa X of the functions Fe(X) and Fk(X) is also slightly distorted, which results in the desired shifting of the zero points. The sum illumination function Js(Lx), however, remains unchanged.

Figure 9:
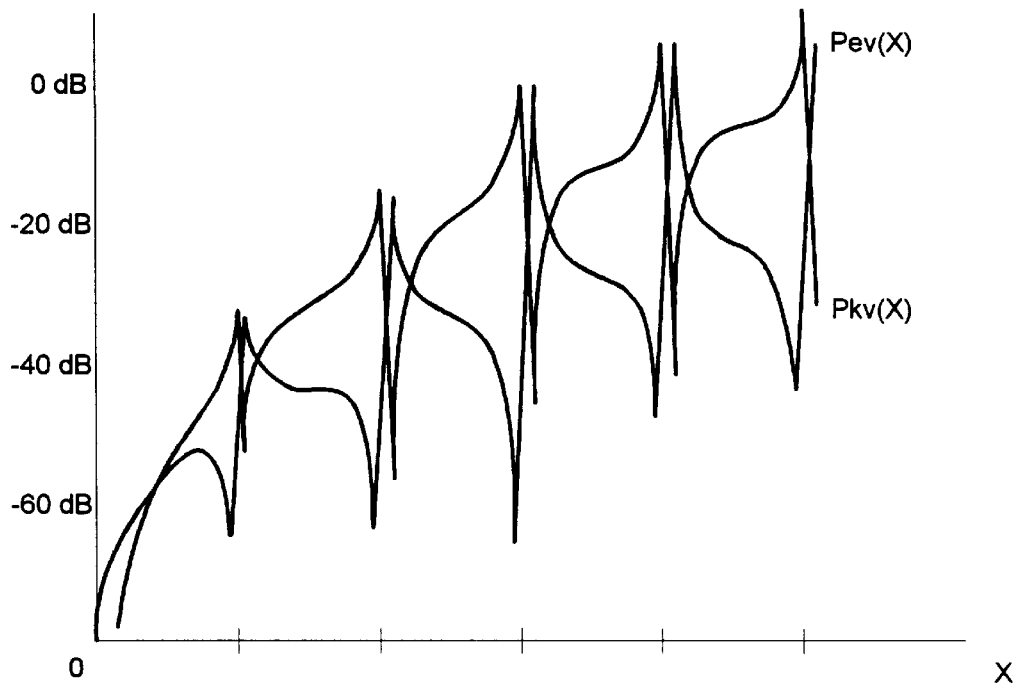
FIG. 9 depicts the signal power Pev(X), Pkv(X) of the quotient functions Qev(X), Qkv(X) that are based on distorted antenna functions Fev(X), Fkv(X), and Fsv(X)
Figure 10:
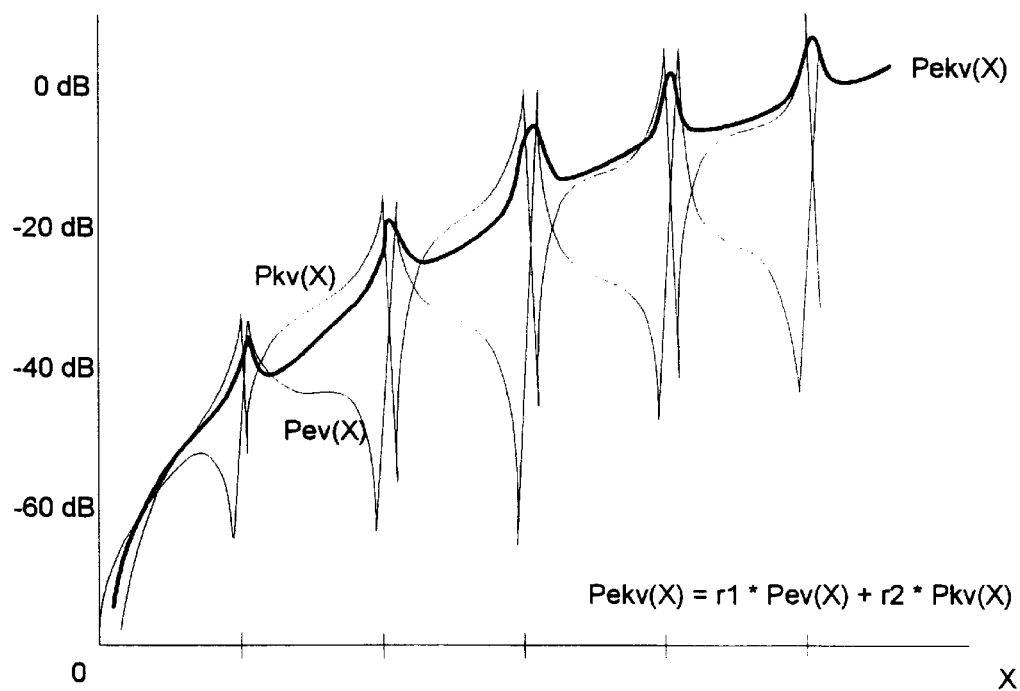
FIG. 10 depicts the quotient power sum function Pekv(X) of the signal powers Pev(X), Pkv(X) from FIG. 9.

The progressions of the quotient power functions Pev(X) and Pkv(X) are shown in FIG. 9. Clearly, the individual quotient power functions Pev(X) and Pkv(X) are now no longer suitable for a comparison with a threshold value due to the drops in the function progression. However, the quotient power sum function Pekv(X)=r1 * Pev(X)+r2 * Pkv(X) that is produced by adding the powers Pev(X), Pkv(X) of the quotient functions Qev(X) and Qkv(X) no longer has any zero points or downward swings, which could fall below the determined threshold value (see FIG. 10). Swings that occur between the zero points of the functions Fev(X), Fkv(X) extend upward above the predetermined threshold value and are non-critical since they lie outside the main lobe of the antenna. The positions at which positive peaks occur in the progression of the quotient power sum function Pekv(X) thus already lie in the region of the side lobes within which the threshold value is exceeded anyway. The process according to the invention therefore fulfills all of the requirements of a reliable SLS process.

The process described above can preferably be used for radar systems according to WO 97/22890 (see FIG. 2), and is generally suitable for systems with three functions per measurement axis.

Figure 11:
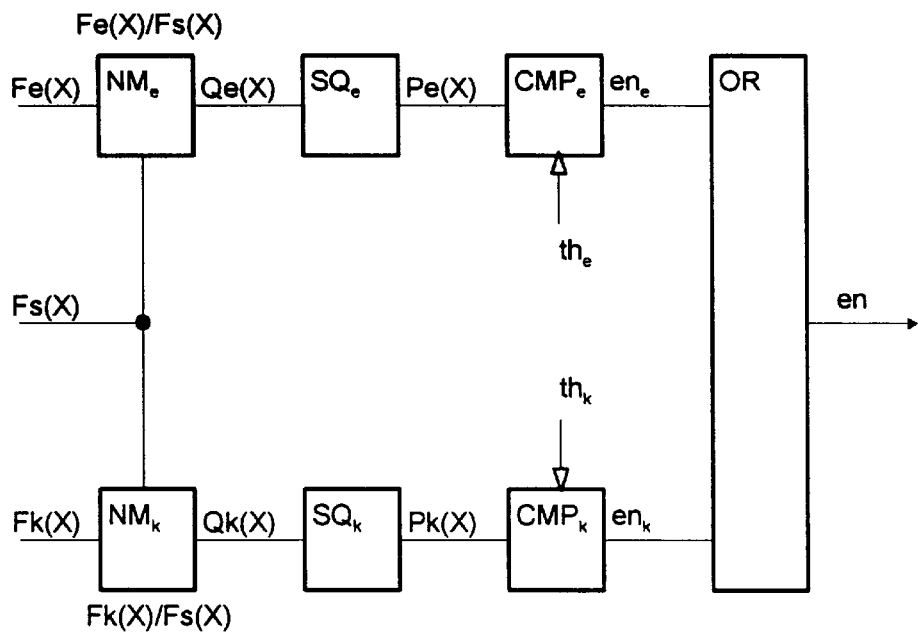
FIG. 11 shows a circuit arrangement for producing and monitoring the signal powers Pe(X), Pk(X)

FIG. 11 shows a circuit arrangement, which is suitable for executing the SLS process, for the monopulse radar device known from WO 97/22890, in which the received signals are processed in accordance with the antenna functions Fe(X), Fk(X), Fs(X) provided for each measurement axis, and are transmitted to a division stage $NM_e$ or $NM_k$. In the division stage $NM_e$ or $NM_k$ the signals of the first two antenna functions Fe(X), Fk(X) are divided by the signal of the third antenna function Fs(X), which produces the signals of the quotient functions Qe(X) and Qk(X), which are each supplied to a comparator $CMP_e$ or $CMP_k$ via quadrature stages $SQ_e$ or $SQ_k$. The powers Pe(X) and Pk(X) of the signals of the quotient functions Qe(X) and Qk(X) that are sent by quadrature stages $SQ_e$ or $SQ_k$ are compared to threshold values $th_e$ or $th_k$ in the comparators $CMP_e$ or $CMP_k$. The logic signals ene and $en_k$, which are supplied by the output of the comparators $CMP_e$ and $CMP_k$ of a logic circuit OR, are used to indicate whether the signal power Pe(X) or Pk(X) has exceeded the threshold value $th_e$ or $th_k$. If one of the signal powers Pe(X) or Pk(X) exceeds the threshold value $th_e$ or $th_k$, this is indicated by the logic signal en sent by the logic circuit OR, and in conjunction with this, signals that have been received via the side lobes sl can therefore be suppressed.

Signals of the antenna functions Fev(X), Fkv(X), which are produced when there are distorted (compressed or expanded) illumination functions Jev(Lx), Jkv(Lx), are processed in the same manner.

Figure 12:
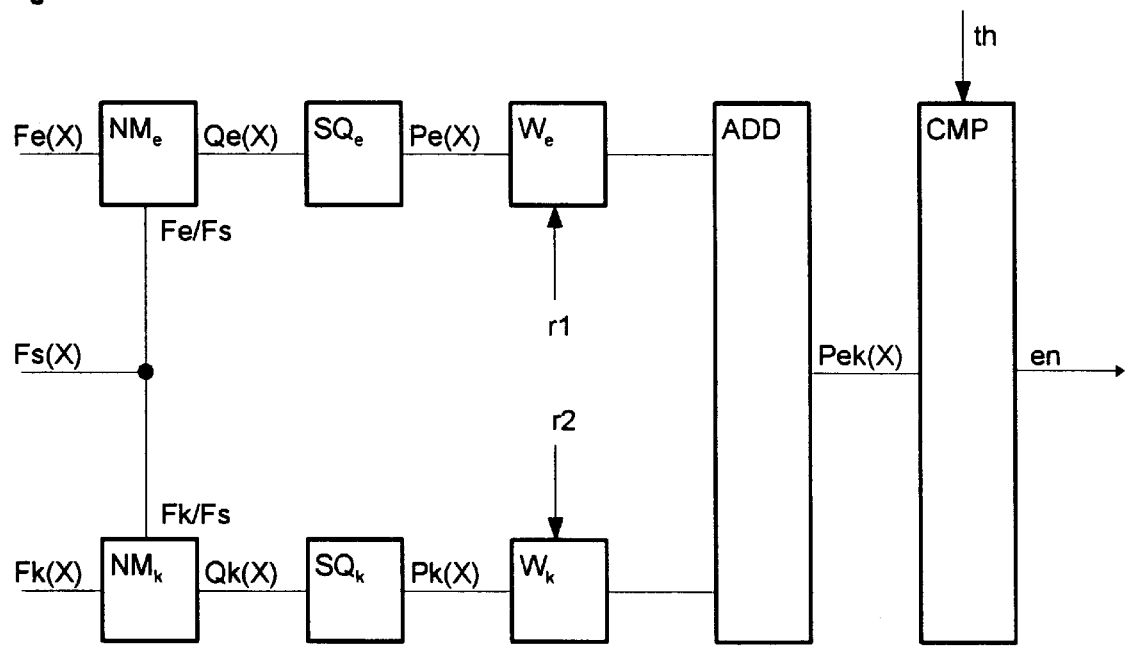
FIG. 12 shows a first circuit arrangement for producing and monitoring the quotient power sum function Pek(X)

In the preferable embodiment shown in FIG. 12, the powers Pe(X) and Pk(X) that are emitted by the quadrature stages $SQ_e$ and $SQ_k$ are weighted in stages $W_e$ or $W_k$, taking into account weighting factors r1, r2, and are then supplied to an addition stage ADD in which the quotient power sum function Pek(X) (or Pekv(X)) is produced from the weighted powers Pe(X) and Pk(X) (in a manner analogous to that for Pev(X) and Pkv(X) when there are distorted antenna functions). In the comparator CMP, the signals of the quotient power sum function Pek(X) or Pekv(X) are compared with a threshold value th. Depending on this, the comparator CMP emits a logic signal by which signals that are received via side lobes sl can be suppressed.

Figure 13:
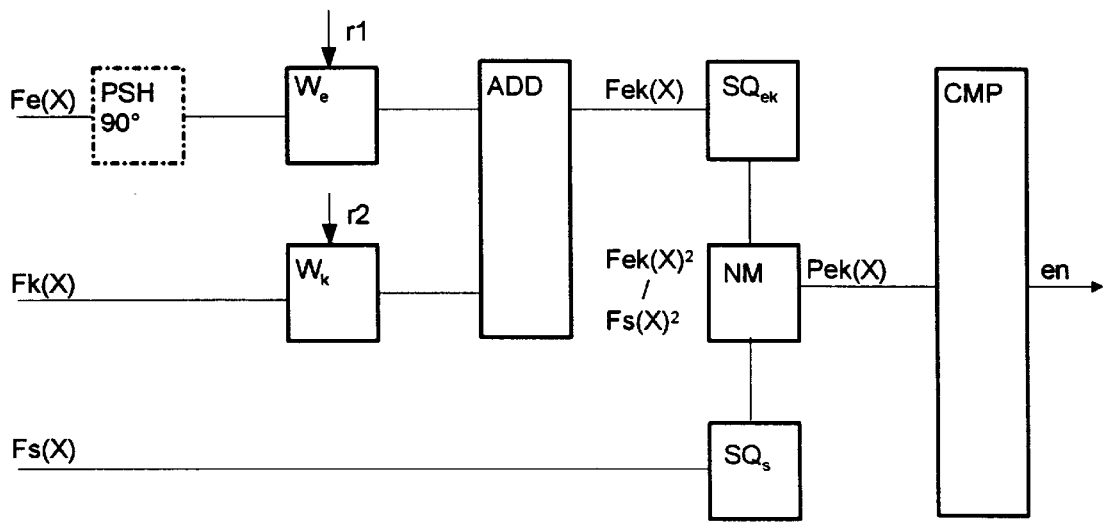
FIG. 13 shows a second circuit arrangement for (vectorially) producing and monitoring the quotient power sum function Pek(X)

In FIG. 13, the signals of the antenna functions Fe(X), Fk(X), which are phase shifted by 90° in relation to each other, are weighted in stages $W_e$ and $W_k$, taking into consideration weighting factors r1, r2, and are then vectorially added in an addition stage VADD. In the same way as the signal of the sum function Fs(X), the output signal of the addition stage VADD or the sum vector Fek(X) are each supplied via a quadrature stage $SQ_{ek}$ or $SQ_s$ of a division stage NM from which the normalized power Pek of the quotient power sum function Pek(X) is sent to a comparator CMP, which compares the signals of the quotient power sum function Pek(X) with a threshold value and emits a signal en that depends on this comparison and the processing of signals that are received via side lobes sl can consequently be suppressed by this signal.

The reciprocal phase shifting of signals of the antenna functions Fe(X), Fk(X) by 90° assures that with the vectorial addition of the signals, no reciprocal quenching occurs. Drops in the sum vector Fek(X) are consequently prevented.

The invention can be used not only for the suppression of the effect of signals that have been received via side lobes sl of the radar antenna of a radar system that operates with three antenna functions Fe(X), Fk(X), and Fs(X) (RSLS). Signals are been transmitted via the side lobes sl of the radar antenna can, upon receipt in a transponder, be identified according to the invention as follows and a transponder response as an effect can thus be suppressed (ISLS). In order to test whether a signal has been emitted via the main lobe or a side lobe, a comparison is in turn made of the signals that on the one hand are emitted via the sum diagram and on the other hand, those that are emitted via the slope diagram and the curvature diagram. A quotient is in turn produced between these signals that are received in the transponder and this quotient is compared with a threshold value. If the power of the signal emitted via the sum diagram exceeds the power of the signal emitted via the slope diagram and the curvature diagram by a particular amount, it is assumed that the received signal was emitted via the main lobe of the radar antenna. However, if the power of the signal emitted via the slope diagram and the curvature diagram preponderates, then it is assumed that the received signal was emitted via a side lobe sl of the radar antenna. In this case, a transponder response can be suppressed. The steps mentioned above are thus analogous to the steps according to the invention described at the beginning, by means of which signals that are received via side lobes sl can be identified and their effects can be suppressed. The signal comparison according to the invention occurs in the first case (reception) internally (RSLS) and in the second case (transmission) externally (ISLS) in the transponder.

The steps indicated below are provided so that the signals of the sum, slope, and curvature diagrams to be compared can be obtained in the transponder. The signals are emitted via the sum, slope, and curvature diagram in a fixed sequence and in a time-lag fashion. For example, first a signal is emitted via the sum diagram. Then a signal is emitted via the slope diagram and the curvature diagram. Preferably the emission via the slope diagram and the curvature diagram occurs simultaneously. The signals that are weighted with factors r1, r2 are thereby emitted phase shifted by 90° via the slope diagram and the curvature diagram.

Figure 14:
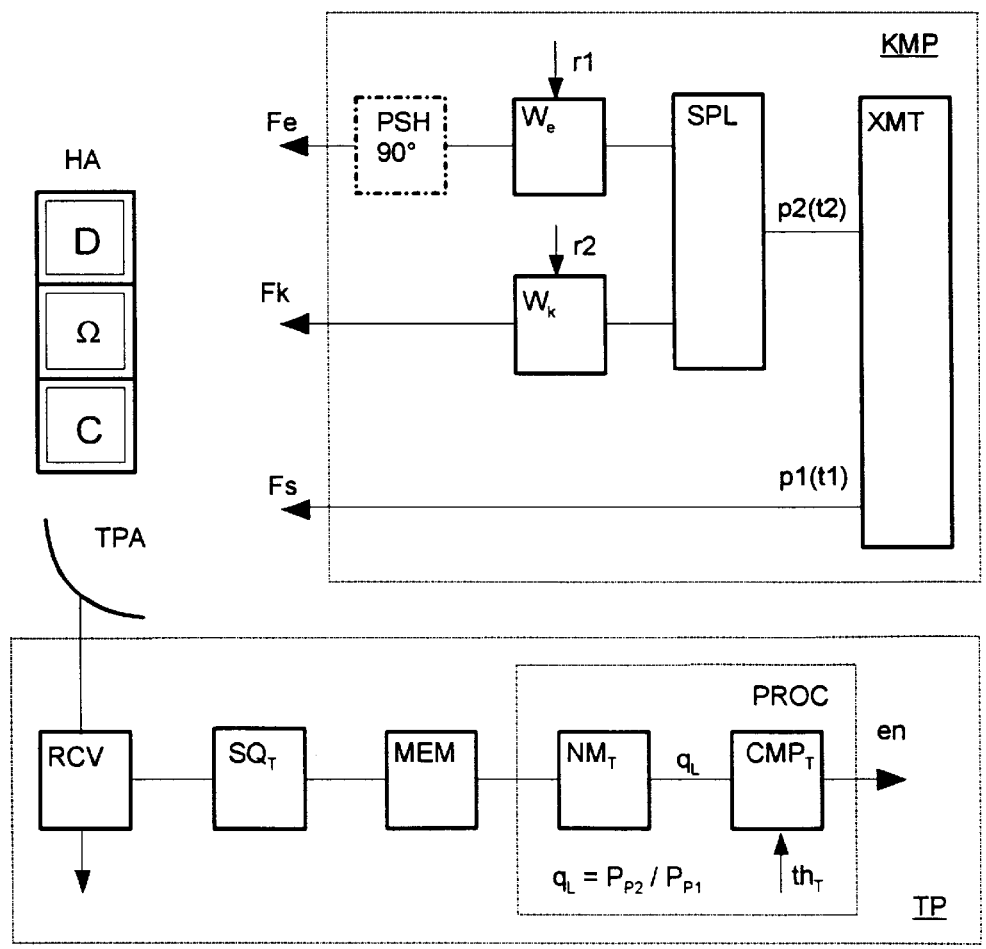
FIG. 14 shows a radar system with a base station KMP and a transponder TP, in which transponder responses can be suppressed when query signals are emitted by the base station KMP via side lobes.

FIG. 14 shows a circuit arrangement for a radar system that has a base station KMP, which is provided for emitting radar signals, and a transponder TP, which compares the powers of time-lagged signals emitted via the sum diagram or the slope diagram and the curvature diagram, and depending on this comparison, sends a transponder response. The base station has a sending stage XMT, which can emit a first pulse p1 at a time t1 via the sum diagram and can emit a second pulse at a time t2, which pulse is split in a signal splitter SPL. The signal parts emitted by the signal splitter SPL are each weighted in a stage $W_e$ or $W_k$ and if need be, after a phase shifting, are emitted phase shifted by 90° via the slope diagram and the curvature diagram of the radar antenna HA. Therefore after a time delay δ, the first pulse p1 is received by the antenna TPA of the transponder TP at time t1+δ, and the second pulse p2, or the sum signal of the signals emitted via the slope diagram and the curvature diagram, is received by this antenna at time t2+δ. Through the reciprocal 90° shifting of the signals emitted via the slope diagram and the curvature diagram, reciprocal quenching of the signals is prevented, as has already been mentioned. Furthermore, the power of the sum of the signals that are phase shifted by 90° yields the sum of the powers of the two signals (Pythagoras).

The received signals are transmitted by the antenna TPA of the transponder TP by way of a reception stage RCV to a quadrature stage $SQ_T$, from which the values of the powers $P_{p1}, P_{p2}, \ldots$ of the received pulses p1, p2, . . . are supplied to a memory unit MEM. After the values of the powers $P_{p1}$, $P_{p2}$, of the two pulses p1, p2 are in the memory MEM, a quotient $q_L = P_{p1}/P_{p2}$ is produced in a division stage $NM_T$, which quotient is compared with a threshold value $th_T$ in a comparator $CMP_T$. If the threshold value $th_T$ has been exceeded, then the received signals were emitted via a side lobe sl of the radar antenna HA of the base station KMP. The function of the circuit arrangement according to FIG. 14 corresponds to that of FIG. 13, but the functional elements of antenna function/phase shifting and weighting of the signal occur in the reverse order and the vectorial addition of the transmitted signals of the slope function Fe(X) and the curvature function Fk(X) does not occur in a module (VADD), but in the propagation path of the electromagnetic wave. Furthermore, a sequential transmission of the signals of the sum function Fs(X) (time t1) and of the slope function and the curvature function Fe(X) and Fk(X) (time t2) takes place, as is customary in the ISLS process. It is naturally also possible to transmit the signals of the sum function Fs(X), the slope function Fe(X), and the curvature function Fk(X) sequentially at times t1, t2, and t3, and to process them according to the invention. The above-mentioned differences between FIGS. 13 and 14 have no influence on the overall function of the circuit.

The use of a phase shifter PSH (see FIGS. 13 and 14) is normally required only in amplitude monopulse radar devices and not in phase monopulse radar devices since in the latter instance, the 90° phase shifting of FE(X) is already taken into account as a property of the phase monopulse antenna.

What is claimed is:

1. A method for suppressing the effect of signals that are received or sent via side lobes of an antenna of an amplitude or phase monopulse radar device, comprising:

providing three illumination functions for the antenna for each measurement axis, the three illumination functions provided for position measurement of targets, three antenna functions produced from the three illumination functions for the antenna;

producing a quotient between at least one of signals and signal powers that are at least one of received and sent via at least one of the first and the second antenna function of the three illumination functions for the antenna and at least one of the signal and its signal power that is at least one of received and sent via the third antenna function of the three illumination functions for the antenna;

comparing the quotient with a threshold value; and determining whether the signal and its signal power were at least one of received and sent via a side lobe of the antenna.

2. The method according to claim 1 comprising:

normalizing the first and the second antenna function with the third antenna function;

producing quotient functions from the normalizing; and comparing signal powers of the quotient functions at least one of individually and if necessary weighted with factors and summed, with at least one threshold value.

3. The method according to claim 1 comprising:

normalizing the powers of the signals of the first and second antenna function, which have if necessary, been weighted with the factors and vectorially added, with the power of the signals of the third antenna function;

producing a quotient power function from the second normalizing, the values of the quotient power function being compared with a threshold value;

sending first transmission signals that are transmitted by at least one of the first and the second antenna function to a receiving station chronologically separate from second transmission signals that are transmitted by the third antenna function;

producing in the receiving station a quotient from the powers of the first and second transmission signals;

comparing the quotient with a threshold value; and suppressing the effects of the received signals if the threshold value is exceeded.

4. The method according to claim 1, the illumination functions being selected such that the zero points of the antenna functions, which result by Fourier transformation from the illumination functions, at least one of occur with at least almost the same target direction and not occur with the same target direction.

5. The method according to claim 4, the first illumination function being selected as the first differentiation of the third illumination function, the second illumination function being selected as the second differentiation of the third illumination function, after which, a shifting of the zero points of the first and the second illumination function being produced by a linear distortion in the abscissa that represents a function argument such that a progression of the first illumination function is expanded in comparison to the first illumination function and a progression of the second illumination function is compressed in comparison to the second illumination function, wherein the zero points of the first and second antenna functions are disposed at least one of lower and higher values than the corresponding zero points of the third antenna function.

6. The method according to claim 4, the first illumination function being selected as the first differentiation of the third illumination function, the second illumination function being selected as the second differentiation of the third illumination function, after which, a shifting of the zero points of the first and the second illumination function being produced by a linear distortion in the abscissa that represents a function argument such that a progression of the second illumination function is expanded in comparison to the second illumination function and a progression of the first illumination function is compressed in comparison to the first illumination function, wherein the zero points of the first and second antenna functions are disposed at least one of lower and higher values than the corresponding zero points of the third antenna function.

7. The method according to claim 1, comprising producing a reciprocal phase shifting of ±90° at least one of before the summation in the receiving instance and before the reciprocal superimposition in the sending instance, the reciprocal phase shifting being produced between the signals to be added that belong to the first and the second antenna function.

8. The method according to claim 1, the antenna functions being used for target measurement in accordance with the curvature process, the first antenna function being a slope function, the second antenna function being a curvature function, and the third antenna function being a sum function.

9. The method according to claim 1, comprising selecting the threshold value such that the effects of signals that are received from outside the main lobe are suppressed.

10. A radar device for at least one of amplitude and phase monopulse for carrying out the method according to claim 1 comprising:

an antenna, three illumination functions and antenna functions resulting from the three illumination functions being provided for each measurement axis of the antenna;

a division stage, the at least one of signals and signal powers that are at least one of received and sent via at least one of the first and the second antenna function being compared in the division stage with at least one of the signals and signal powers that are at least one of received and sent via the third antenna function; and a comparator, the signal emitted by the division stage being supplied directly to the comparator via a quadrature stage, a weighting stage, and an addition stage, the comparator comparing the supplied signal with a threshold value, the comparator sending a signal based on the comparing, the effect of signals that are at least one of received and sent via side lobes being suppressed when the threshold value is exceeded.

11. The radar device according to claim 10, the signals of at least one of the first and the second antenna function being divisible by the signals of the third antenna function in a division stage, the resulting quotients each being supplied via a quadrature stage to a comparator in which they are compared with the threshold values.

12. The radar device according to claim 10, the signals of at least one of the first and the second antenna function being divisible by the signals of the third antenna function in a division stage, the resulting quotients each being supplied via a quadrature stage and a weighting stage to an addition stage, the addition stage being connected to a comparator in which the supplied signals are compared with the threshold value.

13. The radar device according to claim 10, the signals of the first and the second antenna function each being summed via a weighting stage and an addition stage and being supplied to a first quadrature stage, the signals of the third antenna function being supplied to a second quadrature stage, the output signals of the first quadrature stage being divisible in a division stage by the output signals of the second quadrature stage, the resulting quotient being compared with the threshold value in the comparator.

14. The radar system that has an amplitude or phase monopulse radar device according to claim 10, comprising:

a sending stage, the sending stage being a part of the amplitude or phase monopulse radar device, the sending stage being used for time-lagged emission of first and second transmission signals to the antenna;

a receiving station, the second transmission signals being transmittable to the receiving station by at least one of the first and the second antenna function, the first signals being transmittable to the receiving station by the third antenna function, a quotient being produced in the receiving station if need be after being temporarily stored in a memory module, the quotient being produced in a division stage from the powers of the first and second transmission signals, the quotient being compared with the threshold value in the comparator.

15. The radar device according to one of claim 10, the illumination functions being selected such that the zero points of the antenna functions that result by Fourier transformation from the illumination functions occur with at least the same target direction.

16. The radar device according to one of claim 10, the illumination functions being selected such that the zero points of the antenna functions that result by Fourier transformation from the illumination functions not occurring with the same target direction.

* * * * *